United States Patent [19]
Bota et al.

[11] Patent Number: 5,018,408
[45] Date of Patent: May 28, 1991

[54] CONTROL SYSTEMS FOR POWER TRAINS PROVIDED IN VEHICLES

[75] Inventors: Keiji Bota; Kenji Sawa, both of Hiroshima, Japan

[73] Assignee: Mazda Motor Corporation, Hiroshima, Japan

[21] Appl. No.: 246,784

[22] Filed: Sep. 20, 1988

[30] Foreign Application Priority Data

Sep. 26, 1987 [JP] Japan ................. 62-241562

[51] Int. Cl.⁵ ............................. B60K 41/06
[52] U.S. Cl. ......................... 74/866; 74/867
[58] Field of Search ............ 74/866, 867, 869, 877, 74/868; 123/399; 364/424.1

[56] References Cited

U.S. PATENT DOCUMENTS

| | | | |
|---|---|---|---|
| 4,453,516 | 6/1984 | Filsinger | 123/399 X |
| 4,508,078 | 4/1985 | Takeuchi et al. | 123/399 |
| 4,667,541 | 5/1987 | Shimaoka et al. | 74/866 |
| 4,669,335 | 6/1987 | Matsuoka et al. | 74/866 |
| 4,691,676 | 9/1987 | Kikuchi | 123/399 |
| 4,691,677 | 9/1987 | Hotate et al. | 123/399 |
| 4,720,792 | 1/1988 | Kasai et al. | 74/866 X |
| 4,727,838 | 3/1988 | Oshiage et al. | 123/399 X |
| 4,729,356 | 3/1988 | Kaneko et al. | 123/361 |
| 4,735,181 | 4/1988 | Kaneko et al. | 123/361 |
| 4,765,295 | 8/1988 | Ishikawa et al. | 123/399 |
| 4,765,296 | 8/1988 | Ishikawa et al. | 123/399 |
| 4,771,752 | 9/1988 | Nishimura et al. | 123/399 X |
| 4,785,782 | 11/1988 | Tanaka et al. | 123/399 |
| 4,799,467 | 1/1989 | Ishikawa et al. | 123/399 |
| 4,800,497 | 1/1989 | Koori et al. | 74/866 X |
| 4,811,712 | 3/1989 | Iton | 123/399 |
| 4,834,045 | 5/1989 | Imai | 123/399 X |

FOREIGN PATENT DOCUMENTS

| | | | |
|---|---|---|---|
| 110226 | 6/1984 | European Pat. Off. | 123/399 |
| 59-10751 | 1/1984 | Japan . | |
| 2154765 | 9/1985 | United Kingdom | 123/399 |

Primary Examiner—Dwight Diehl
Attorney, Agent, or Firm—Sixbey, Friedman, Leedom & Ferguson

[57] ABSTRACT

A control system for a power train provided in a vehicle to include an engine which has an engine output adjusting device, such as a throttle valve, controlled through an electric actuator in accordance with a controlled variable on an accelerator and an automatic transmission in which a speed change operation is automatically performed utilizing operating oil pressure produced in an oil hydraulic control circuit for actuating a speed change mechanism in the automatic transmission having engaging friction elements and controlled to vary in accordance with an operating condition of the engine, which comprises a first detecting device for detecting the controlled variable on the accelerator, a second detecting device for detecting a controlled variable on the engine output adjusting device, a third detecting device for detecting a travelling speed of the vehicle, a device for controlling the speed change mechanism to cause the same to carry out the speed change operation based on detection outputs of the first and third detecting devices, and a device for controlling the operating oil pressure applied to the engaging friction elements in the speed change mechanism based on a detection output of the second detecting device.

17 Claims, 6 Drawing Sheets

CONTROL SYSTEMS FOR POWER TRAINS PROVIDED IN VEHICLES

BACKGROUND OF THE INVENTION

1. Field of the Invention

The present invention relates generally to control systems for power trains provided in vehicles, and more particularly, to a system for controlling a power train provided in a vehicle and including an engine having an engine output adjusting device, such as a throttle valve, which is controlled through an electric actuator in accordance with a controlled variable on an accelerator accompanying with the engine and an automatic transmission which is coupled with the engine and in which speed change is automatically performed by means of oil pressure produced in an oil hydraulic control circuit for actuating a speed change mechanism and controlled to vary in accordance with the operating condition of the engine.

2. Description of the Prior Art

There has been proposed a throttle valve control system for controlling electrically a throttle valve in an engine provided in a vehicle to vary its opening degree in accordance with a controlled variable on an accelerator accompanying with the engine, as disclosed in, for example, the Japanese patent application published before examination under the publication number 59/10751. In such a throttle valve control system, a relation between the opening degree of the throttle valve and the controlled variable on the accelerator can be predetermined to be desirable. Therefore, with the throttle valve control system thus proposed previously, it has been put into practice to have a throttle valve operation optimal to the operating condition of the engine by varying a rate of variation in the opening degree of the throttle valve to the controlled variable on the accelerator in accordance with the operating condition of the vehicle engine, for example, in such a manner that the rate of variation in the opening degree of the throttle valve to the controlled variable on the accelerator is increased in response to a requirement of acceleration when the engine is operating with relatively small load or at relatively low speed, or by varying the rate of variation in the opening degree of the throttle valve to the controlled variable on the accelerator in accordance with a rate of change in the controlled variable on the accelerator. Further, it has been also put into practice to vary the predetermined relation between the opening degree of the throttle valve and the controlled variable on the accelerator in response to each of selected speeds in a transmission coupled with the engine to which the throttle valve control system is applied.

Meanwhile, there has been commonly used in vehicles an automatic transmission which is coupled with an engine provided in the vehicle and includes a torque converter, a power transmitting gear arrangement including a speed change mechanism having engaging friction elements, such as clutch and brake elements, operating with oil pressure, and a hydraulic pressure control device including an oil hydraulic control circuit for causing the speed change mechanism to perform speed change. In such an automatic transmission, generally, a speed change control according to a predetermined speed change characteristic is carried out in response to variations in engine load and in travelling speed of the vehicle and an operating oil pressure control in which operating oil pressure in the oil hydraulic control circuit is controlled in response to variations in the engine load so as to have a value appropriate to an engine output transmitted to the speed change mechanism in the power transmitting gear arrangement is also carried out to keep selected one or more of the engaging friction elements to be in engagement without shocks of great degree on the occasion of each speed change. For each of the speed change control and the operating oil pressure control, the engine load is represented by a control variable on an accelerator or an opening degree of a throttle valve.

In the case where the speed change control and the operating oil pressure control proposed previously as mentioned above are performed in the automatic transmission coupled with an engine to which the aforementioned throttle valve control system is applied for controlling electrically a throttle valve in the engine, the following problems arise.

In the engine having the throttle valve controlled electrically and coupled with the automatic transmission, the opening degree of the throttle valve is varied suddenly in response to a small variation in the controlled variable on the accelerator under a condition in which the engine operates with an increased rate of variation in the opening degree of the throttle valve to the controlled variable on the accelerator or the opening degree of the throttle valve is varied in response to a speed change operation in the automatic transmission under a condition in which a relation between the opening degree of the throttle valve and the controlled variable on the accelerator is varied in response to each of selected speeds in the automatic transmission. Therefore, it is feared that an undesirable hunting condition in speed change operation in which unnecessary speed changes are repeatedly carried out is brought about due to the variations in the opening degree of the throttle valve caused in such a manner as mentioned above under the speed change control performed in the automatic transmission. Further, the throttle valve is controlled by an electric actuator to have an opening degree corresponding to the controlled variable on the accelerator and therefore the engine output is not always in a fixed proportion to the controlled variable on the accelerator in the engine having the throttle valve controlled electrically. Therefore, it is also feared that the operating oil pressure in the oil hydraulic control circuit is not controlled to have a pressure value appropriate to the engine output under the operating oil pressure control performed in the automatic transmission.

OBJECTS AND SUMMARY OF THE INVENTION

Accordingly, it is an object of the present invention to provide a control system for a power train provided in a vehicle and including an engine having an engine output adjusting device controlled electrically in accordance with a controlled variable on an accelerator accompanying with the engine and an automatic transmission wherein speed change is automatically performed by means of operating oil pressure applied thereto from an oil hydraulic control circuit, which avoids the aforementioned problems encountered with prior art.

Another object of the present invention is to provide a control system for a power train provided in a vehicle and including an engine having an engine output adjusting device controlled electrically in accordance with a controlled variable on an accelerator accompanying with the engine and an automatic transmission wherein speed change is automatically performed by means of operating oil pressure applied thereto from an oil hydraulic control circuit, in which both a control for speed change in accordance with a travelling condition of the vehicle and a control for operating oil pressure in the oil hydraulic circuit in accordance with an operating condition of the engine are performed favorably in the automatic transmission.

A further object of the present invention is to provide a control system for a power train provided in a vehicle and including an engine having an engine output adjusting device controlled electrically in accordance with a controlled variable on an accelerator accompanying with the engine and an automatic transmission wherein speed change is automatically performed by means of operating oil pressure supplied thereto from an oil hydraulic control circuit, in which an undesirable hunting condition in speed change operation in which unnecessary speed changes are repeatedly carried out is prevented from being caused under a speed change control and operating oil pressure in the oil hydraulic control circuit is properly controlled to have a pressure value appropriate to an engine output under an operating oil pressure control.

According to the present invention, there is provided a control system for a power train provided in a vehicle to include an engine which has an engine output adjusting device controlled through an electric actuator in accordance with a controlled variable on an accelerator accompanying with the engine and an automatic transmission which is coupled with the engine and in which a speed change operation is automatically performed by means of operating oil pressure produced in an oil hydraulic control circuit for actuating a speed change mechanism contained in the automatic transmission to have engaging friction elements and controlled to vary in accordance with an operating condition of the engine, which comprising a first detecting device for detecting the controlled variable on the accelerator, a second detecting device for detecting a controlled variable on the engine output adjusting device, a third detecting device for detecting a travelling speed of the vehicle, a speed change control device for controlling the speed change mechanism to cause the same to carry out the speed change operation based on detection outputs of the first and third detecting devices, and an operating oil pressure control device for controlling the operating oil pressure applied to the engaging friction elements in the speed change mechanism from the oil hydraulic control circuit based on a detection output of the second detecting device.

With the control system thus constituted in accordance with the present invention, a speed change control is carried out in response to variations in the controlled variable on the accelerator represented by the detection output of the first detecting device and variations in the travelling speed of the vehicle represented by the detection output of the third detecting device without causing an undesirable hunting condition in the speed change operation in which unnecessary speed changes are repeatedly carried out, and further, an operating oil pressure control in which the operating oil pressure in the oil hydraulic control circuit is controlled to have a pressure value appropriate to an output of the engine is properly carried out in response to variations in the controlled variable on the engine output adjusting device represented by the detection output of the second detecting device.

The above, and other objects, features and advantages of the present invention will become apparent from the following detailed description which is to be read in conjunction with the accompanying drawings.

DESCRIPTION OF THE PREFERRED EMBODIMENT

The invention will now be described by way of example with reference to the accompanying drawings.

Figure 1:
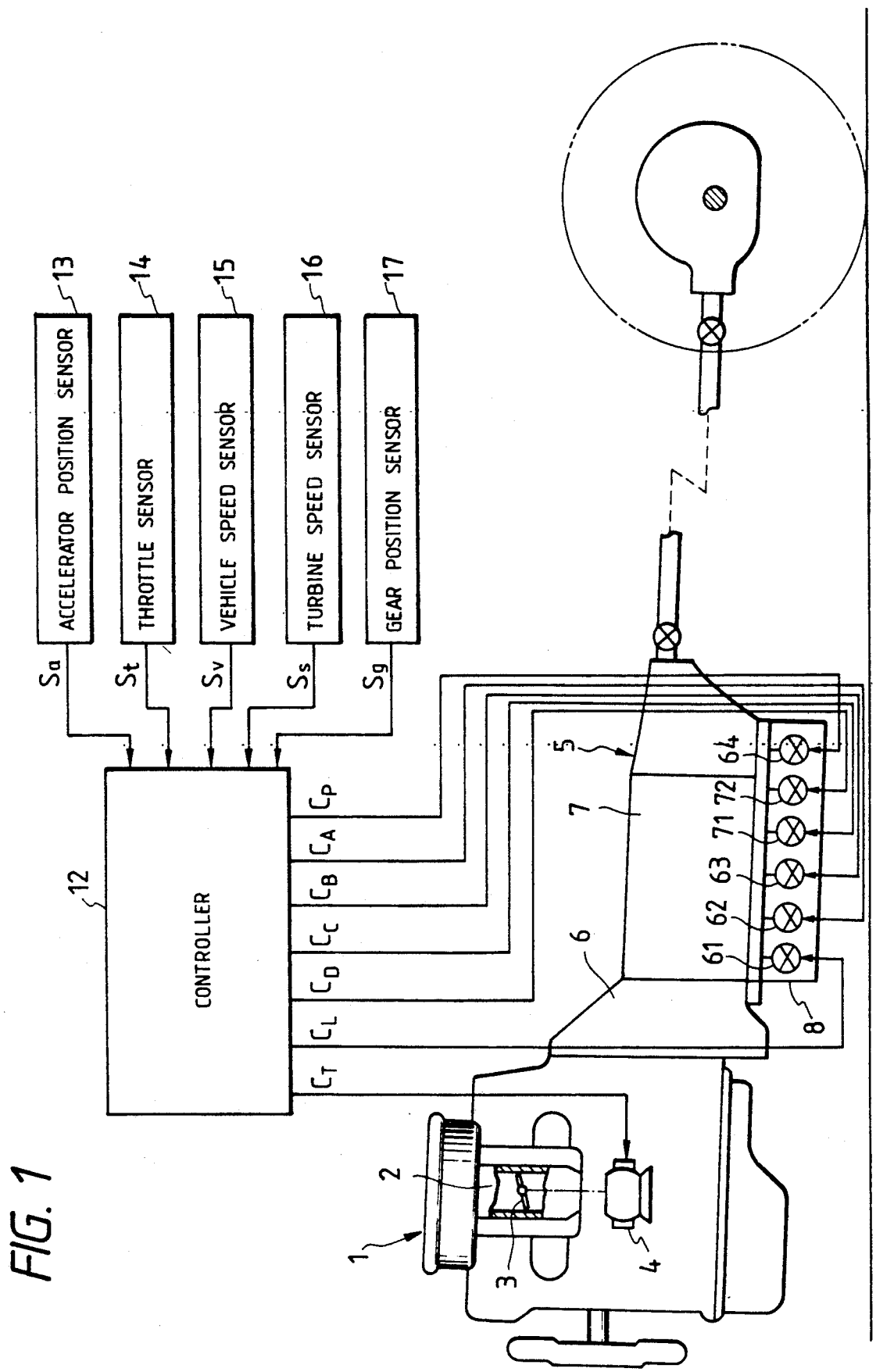
FIG. 1 is a schematic illustration showing one embodiment of control system for a power train provided in a vehicle according to the present invention, together with an engine accompanied with an automatic transmission to which the embodiment is applied.

Referring to FIG. 1, an embodiment of control system for a power train provided in a vehicle according to the present invention, which is operative to perform a throttle valve control, a speed change control and an operating oil pressure control, is applied to an engine 1 and an automatic transmission 5 accompanying with the engine 1, which are mounted on a vehicle to constitute a power train. The engine 1 is provided with an inlet passage 2 in which a throttle valve 3 is disposed to be movable for adjusting air mass flow passing through the inlet passage 2. The throttle valve 3 is driven to vary its opening degree by an electric actuator 4 such as a direct current (DC) motor mounted on the engine 1.

The automatic transmission 5 comprises a torque converter portion 6 coupled with the engine 1 and contains a pump impeller, a turbine runner and a stator, a power transmitting gear arrangement portion 7 provided at the output side of the torque converter portion 6, and an oil hydraulic control circuit portion 8 accompanying with the power transmitting gear arrangement portion 7. The power transmitting gear arrangement portion 7 includes a speed change mechanism which contains a plurality of engaging friction elements, such as clutch and brake elements, operative with oil pressure to form selectively a plurality power transmitting paths in the power transmitting gear arrangement portion 7. The oil hydraulic control circuit portion 8 is provided with solenoid valves 61, 62, 63, 64, 71 and 72 which are controlled by a controller 12 comprising a microcomputer for applying operating oil pressure produced in the oil hydraulic control circuit portion 8 selectively to various elements in the speed change mechanism.

The electric actuator 4 is supplied with a control signal $C_T$ from the controller 12, and the solenoid valves 61 to 64, 71 and 72 are supplied with driving signals $C_L$, $C_A$, $C_B$, $C_P$, $C_C$ and $C_D$, respectively, from the controller 12. The controller 12 is supplied with a detection output signal Sa obtained from an accelerator position sensor 13 for detecting a controlled variable $\alpha$ on an accelerator, a detection output signal St obtained from a throttle sensor 14 for detecting an opening degree $\theta$ of the throttle valve 3, a detection output signal Sv obtained from a vehicle speed sensor 15 for detecting a travelling speed V of the vehicle, a detection output signal Ss obtained from a turbine speed sensor 16 accompanying with the torque converter 6 for detecting a revolving speed of the turbine 15 runner, that is, a turbine speed $\omega$ in the torque converter portion 6, and a detection output signal Sg obtained from a gear position sensor 17 for detecting a gear position G in the power transmitting gear arrangement portion 7.

In the power transmitting gear arrangement portion 7 which is accompanied with the oil hydraulic control circuit portion 8 controlled by the controller 12 as described above, a plurality of shift ranges including, for example, P (parking) range, R (reverse) range, N (neutral) range, D (driving) range, 1st range and 2nd range, and a plurality of speeds including, for example, 1st to 4th speeds at the D range, 1st to 3rd speeds at the 2nd range, and 1st and 2nd speeds at the 1st range, are obtained by causing the engaging friction elements contained in the speed change mechanism to work selectively.

Figure 2:
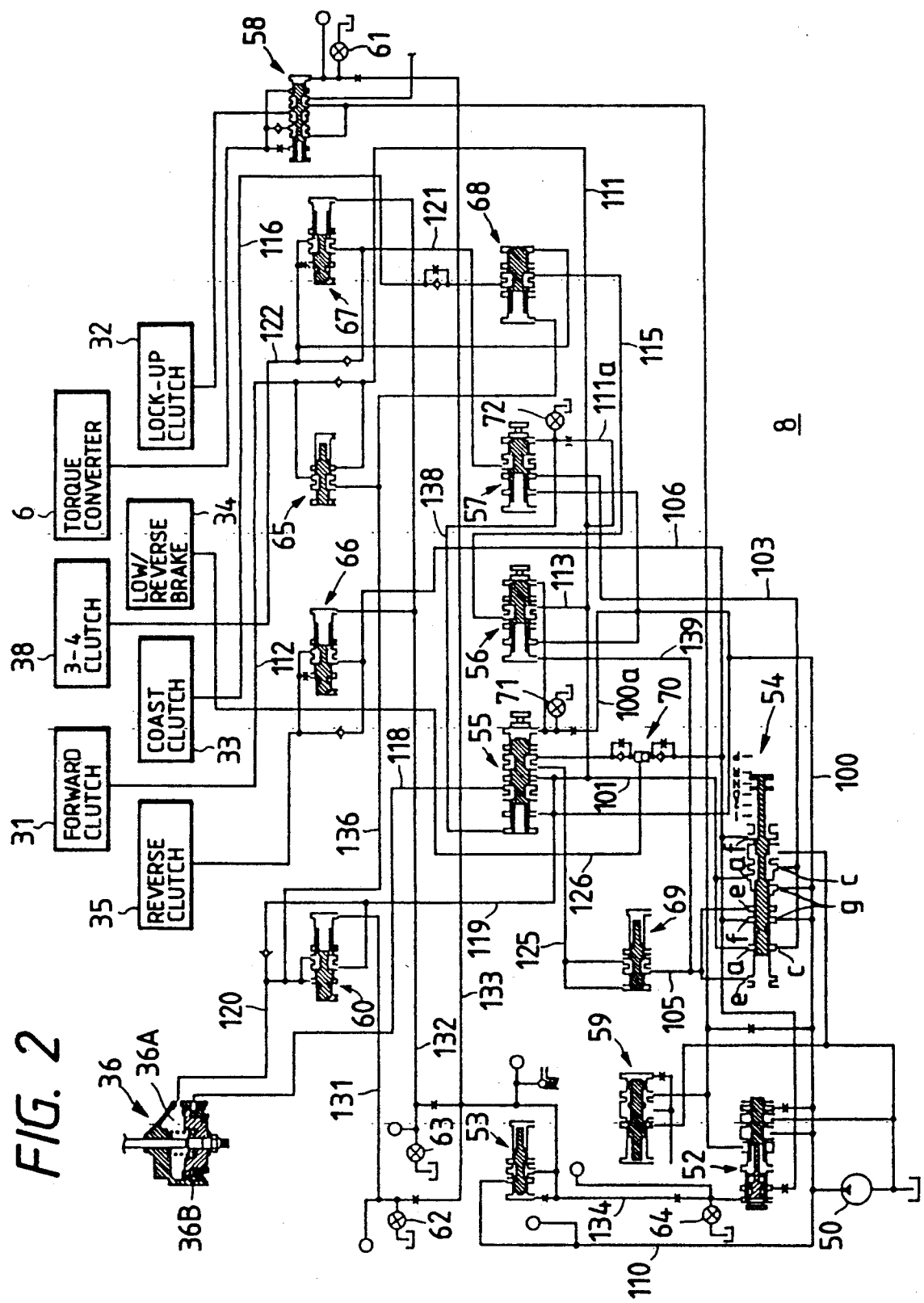
FIG. 2 is a schematic development showing an example of an oil hydraulic control circuit employed in the automatic transmission shown in FIG. 1.

FIG. 2 shows an example of the oil hydraulic control circuit portion 8 accompanying with the power transmitting gear arrangement portion 7 shown in FIG. 1.

In the example shown in FIG. 2, an oil pump 50 is provided for pressuring an operating oil to produce operating oil pressure. The operating oil pressure obtained from the oil pump 50 is adjusted to have an appropriate value in a pressure regulator valve 52 and then led through a pressure line 100 and branch lines therefrom to each of a manual shift valve 54, a 1-2 shift valve 55, a coast-exhaust valve 56, a 2-3 shift valve 57, a lock-up control valve 58, a converter relief valve 59 and a servocontrol valve 60 as line pressure. The operating oil pressure led to the lock-up control valve 58 is then applied to the torque converter portion 6 and a lock-up clutch 32 accompanying with the torque converter portion 6 as occasion demands.

The manual shift valve 54 has 1st, 2nd, D, N, R and P shift range positions, each of which is selected by handling manually a shift lever provided for engaging with the power transmitting gear arrangement portion 7, and also output ports a, c, e and f in addition to an input port g connected to the pressure line 100. When the manual shift valve 54 is in the 1st shift range position, the input port g is permitted to communicate with a forward clutch 31 through the output port a, pressure lines 101 and 111, a forward control valve 65 and a pressure line 112, with a coast clutch 33 through the output port a, the pressure line 101 and 111, a pressure line 113, the coast-exhaust valve 56, a pressure line 115, a coast control valve 68 and a pressure line 116, with an applying chamber 36B of a 2-4 brake device 36 through the output port a, the pressure line 101, the 1-2 shift valve 55 and a pressure line 118, with a releasing chamber 36A of the 2-4 brake device 36 through the output port c, the pressure line 101, a pressure line 119, the servocontrol valve 60 and a pressure line 120, with a low/reverse brake device 34 through the output port e, a pressure line 105, a pressure reducing valve 69, a pressure line 125, the 1-2 shift valve 55, a switching valve 70 and a pressure line 126, and with the coast-exhaust valve 56 through the output port e and a pressure line 139.

When the manual shift valve 54 is in the 2nd or D shift range position, the input port g is permitted to communicate with each of the forward clutch 31, the coast clutch 33, and the applying and releasing chambers 36B and 36A of the 2-4 brake device 36 in the same manner as the case in which the manual shift valve 54 is in the 1st shift range position, and also with a 3-4 clutch 38 through the output port c, a pressure line 103, the 2-3 shift valve 57, a pressure line 121, a 3-4 control valve 67 and a pressure line 122. When the manual shift valve 54 is in the R shift range position, the input port g is permitted to communicate with the low/reverse brake device 34 through the output port f, a pressure line 106, the switching valve 70 and the pressure line 126, and with a reverse clutch 35 through the output port f, the pressure line 106 and a reverse control valve 66.

When the manual shift valve 54 is in the N or P shift range position, the input port g is not permitted to communicate with the output ports a, c, e nor f, and therefore each of the forward clutch 31, coast clutch 33, reverse clutch 35, 2-4 brake device 36, 3-4 clutch 38, low/reverse brake device 34 and lock-up clutch 32 is kept in disengagement.

Further, the operating oil pressure obtained from the oil pump 50 is also led through a pressure line 110 to a pressure reducing valve 53 to be reduced to have a predetermined value therein and then the reduced operating oil pressure from the pressure reducing valve 53 is adjusted to have an appropriate value by each of the solenoid valves 62 and 63. The adjusted operating oil pressures obtained from the solenoid valves 62 and 63 are respectively led to the servocontrol valve 60 through a pressure line 131 and to both the reverse control valve 66 and the 3-4 control valve 67 through a pressure line 132.

The servocontrol valve 60 is operative to adjust the operating oil pressure led thereto through the pressure line 120 from the releasing chamber 36A of the 2-4 brake device 36 and the adjusted operating oil pressure from the servocontrol valve 60 is applied through a pressure line 136 to the coast control valve 68 as pilot pressure and also to the forward control valve 65.

The 2-3 shift valve 57 receives pilot pressure applied thereto through a pressure line 111a branched from the pressure line 111. The pilot pressure toward the 2-3 shift valve 57 is controlled by the solenoid valve 72 so as to be applied to the 2-3 shift valve 57 when the solenoid valve 72 is in its OFF state and so as not to be applied to the 2-3 shift valve 57 when the solenoid valve 72 is in its ON state. The pilot pressure which is applied to the 2-3 shift valve 57 is also applied through a pressure line 138 to the 1-2 shift valve 55, and therefore the 1-2 shift valve 55 receives with both the pilot pressure applied thereto through the pressure line 138 and pilot pressure applied thereto through a pressure line 100a branched from the pressure line 100. The pilot pressure toward the 1-2 shift valve 55 through the pressure line 100a is controlled by the solenoid valve 71 so as to be applied to the 1-2 shift valve 55 when the solenoid valve 71 is in its OFF state and so as not to be applied to the 1-2 shift valve 55 when the solenoid valve 71 is in its ON state. When the pilot pressure is applied through the pressure line 138 to the 1-2 shift valve 55, a spool in the 1-2 shift valve 55 is moved to the right in FIG. 2 so that the pressure line 101 is connected with the pressure line 118 regardless of the operation of the solenoid valve 71.

The pilot pressure controlled by the solenoid valve 71 is applied also to the coast-exhaust valve 56 to which another pilot pressure is applied through the output port e of the manual shift valve 54 and the pressure line 139 when the manual shift valve 54 is in the 1st shift range position. The coast-exhaust valve 56 is operative to cause the operating pressure to be applied selectively to the coast clutch 33 in response to application of each pilot pressure thereto.

The reduced operating oil pressure from the pressure reducing valve 53 is also adjusted by the solenoid valve 61 to be supplied to the lock-up control valve 58 through a pressure line 133 as pilot pressure.

The solenoid valves 61 to 63 are controlled respectively by the driving signals $C_L$, $C_A$ and $C_B$ supplied from the controller 12 to be put in the ON state selectively and similarly the solenoid valves 71 and 72 are controlled respectively by the driving signals $C_C$ and $C_D$ supplied from the controller 12 to be put in the ON state selectively. With the operations of the solenoid valves 62, 63, 71 and 72, the pilot pressure applied to each of the servocontrol valve 60, reverse control valve 66, 3-4 control valve 67, 1-2 shift valve 55 and 2-3 shift valve 57 is adjusted, so that the forward clutch 31, coast clutch 33, reverse clutch 35, 3-4 clutch 38, 2-4 brake device 36 and low/reverse brake device 34 in the automatic transmission are put in engagement selectively to carry out a speed change operation in which a selected speed at a selected shift range is obtained. Further, when the pilot pressure supplied to the lock-up control valve 58 is adjusted by the solenoid valve 61 to have a predetermined value, the operating oil pressure is applied through the lock-up control valve 58 to the lock-up clutch 32 and thereby a lock-up operation in which the lock-up clutch 32 is caused to be in engagement so as to couple a turbine shaft in the torque converter portion 6 directly with an output shaft of the engine 1 is carried out.

The reduced operating oil pressure from the pressure reducing valve 53 is further adjusted by the solenoid valve 64 and applied to the pressure regulator valve 52 through a pressure line 134 as pilot pressure. The solenoid valves 64 is controlled by the driving signal $C_P$ supplied from the controller 12 to be put in the ON state selectively.

Figure 3:
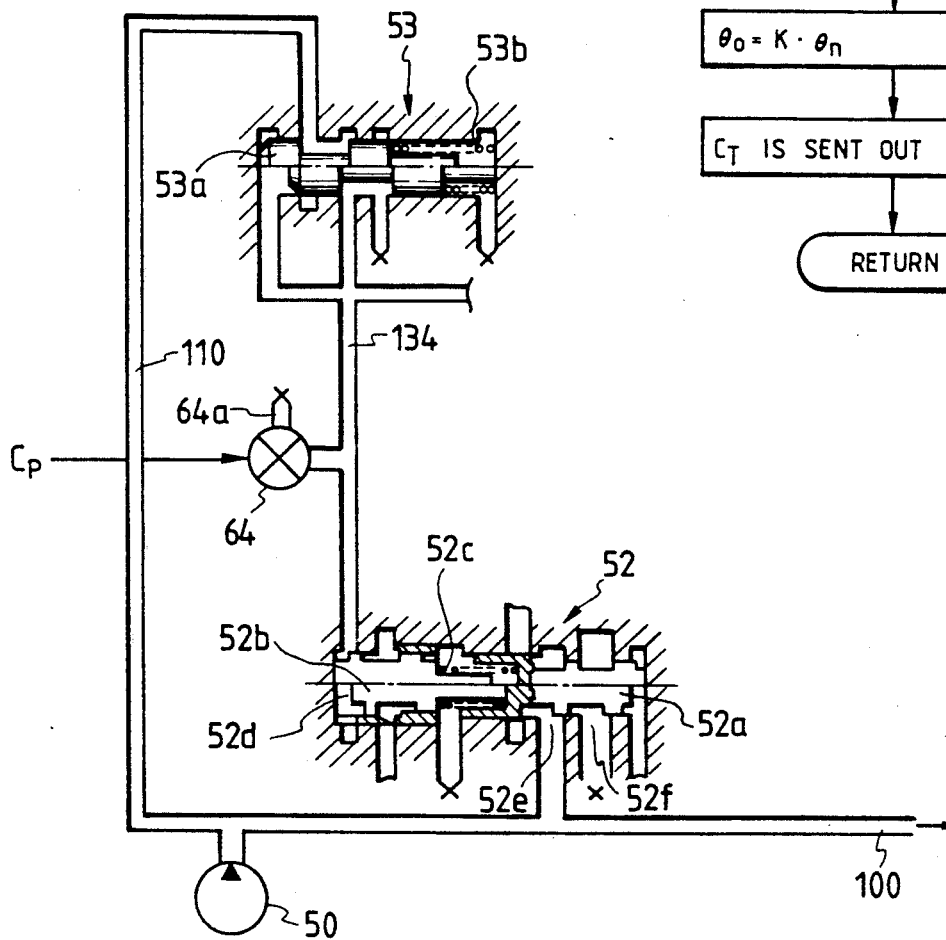
FIG. 3 is an enlarged fragmentary view of the oil hydraulic shown in FIG. 2.

As shown in FIG. 3, the pressure reducing valve 53 is provided with a slidable valve spool 53a and a biasing spring 53b for forcing the slidable valve spool 53a to the left in FIG. 3. The pressure line 110 from the oil pump 50 is connected to an input port of the pressure reducing valve 53 and the pressure line 134 is connected to an output port of the pressure reducing valve 53, so that the operating oil pressure applied to the pressure reducing valve 53 through the pressure line 110 from the oil pump 50 is affected by the slidable valve spool 53a biased by the biasing spring 53b and the reduced operating oil pressure is obtained in the pressure line 134 to be applied to the pressure regulator valve 52 as the pilot pressure.

The pressure regulator valve 52 is provided, as shown in FIG. 3, with a slidable main valve spool 52a, a slidable pilot valve spool 52b disposed to align with the slidable main valve spool 52a and to form a pilot pressure chamber 52d at the side opposite to the slidable main valve spool 52a, and a biasing spring 52c provided between the slidable main valve spool 52a and the slidable pilot valve spool 52b to bias the slidable main valve spool 52a to the left in FIG. 3. The pressure line 134 is connected to the pilot pressure chamber 52d so that the pilot pressure from the pressure reducing valve 53 is applied to the pilot pressure chamber 52d through the pressure line 134 and the pressure line 100 is coupled with an input port 52e provided on the pressure regulator valve 52. Further, the pressure regulator valve 52 is provided with a drain port 52f.

With such a configuration, when the operating oil pressure applied to the input port 52e through the pressure line 100 increases to exceed the pilot pressure applied to the pilot pressure chamber 52d, the slidable main valve spool 52a is moved to cause the drain port 52f to drain a part of the operating oil pressure applied to the input port 52e. Therefore, the operating oil pressure in the pressure line 100 is regulated to be proportional to the pilot pressure applied to the pilot pressure chamber 52d of the pressure regulator valve 52 and applied to various portions as the line pressure.

The pressure line 134 between the pressure reducing valve 53 and the pressure regulator valve 52 is coupled with the solenoid valve 64 having a drain port 64a as shown in FIG. 3. The solenoid valve 64 is operative to vary the pilot pressure applied to the pilot pressure chamber 52d of the pressure regulator valve 52 in accordance with the driving signal $C_P$ supplied from the controller 12. Consequently, the operating oil pressure in the pressure line 100 regulated by the pressure regulator valve 52 is controlled to vary in accordance with the driving signal $C_P$ supplied to the solenoid valve 64 from the controller 12.

The controller 12 is operative to produce the control signal $C_T$ based on the controlled variable α on the accelerator represented by the detection output signal Sa, the travelling speed V of the vehicle represented by the detection output signal Sv, and the gear position G in the power transmitting gear arrangement portion 7 represented by the detection output signal Sg to be supplied to the electric actuator 4, so as to perform a throttle valve control in which the throttle valve 3 is controlled to vary its opening degree in accordance with the operating condition of the engine 1.

The controller 12 is operative also to produce the driving signals $C_A$, $C_B$, $C_C$, $C_D$ and $C_L$ based on the controlled variable α on the accelerator represented by the detection output signal Sa, the travelling speed V of the vehicle represented by the detection output signal Sv, and the gear position G in the power transmitting gear arrangement portion 7 represented by the detection output signal Sg to be supplied to the solenoid valves 62, 63, 71, 2 and 61, respectively, so as to perform a speed change control in which the speed change operation and the lock-up operation are carried out without causing a hunting condition in the speed change operation in which unnecessary speed changes arise repeatedly.

Further, the controller 12 is operative to produce the driving signal $C_P$ based on the opening degree $\theta$ of the throttle valve 3 represented by the detection output signal St and the turbine speed $\omega$ in the torque converter portion 6 represented by the detection output signal Ss to be supplied to the solenoid valve 64, so as to perform an operating oil pressure control in which the line pressure in the oil hydraulic control circuit portion 8 is properly controlled to have a pressure value appropriate to an output of the engine 1.

Figure 4:
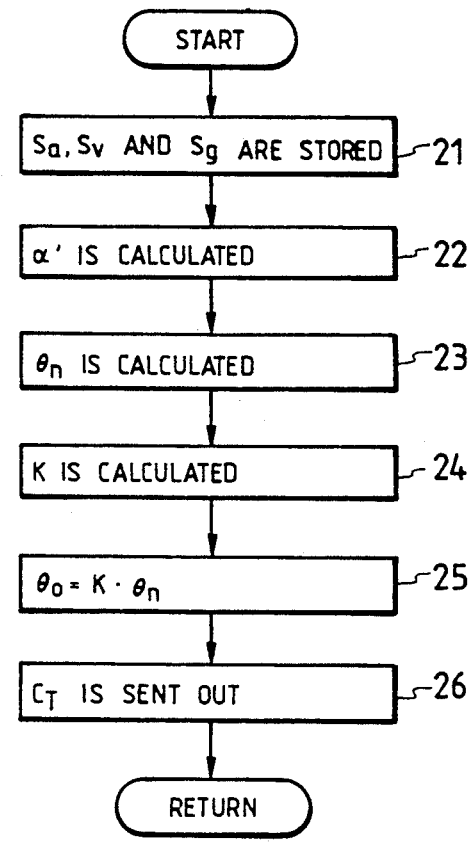
FIG. 4 is a flow chart showing an example of an operation program for a throttle valve control performed by a microcomputer which is used in a controller employed in the embodiment shown in FIG. 1.

An operation program of the microcomputer constituting the controller 12 for conducting the throttle valve control described above is carried out in accordance with a flow chart shown in FIG. 4.

Figure 5:
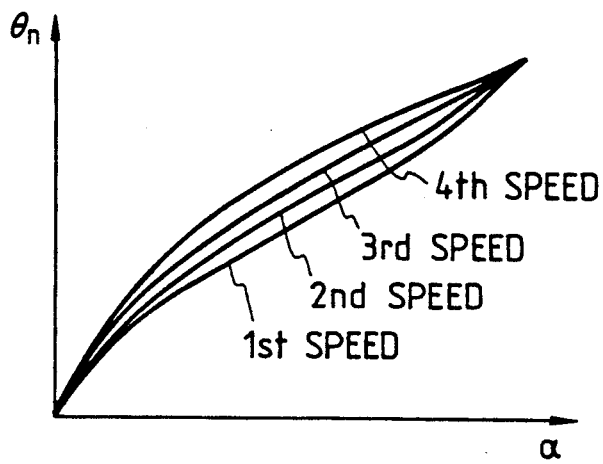
FIGS. 5 and 6 are graphic diagrams used for explaining the operation carried out in accordance with the flow chart shown in FIG. 4.

According to the flow chart shown in FIG. 4, first, in process 21, the detection output signals Sa, Sv and Sg are stored. Next, in process 22, a rate $\alpha'$ of change in the controlled variable $\alpha$ on the accelerator is calculated based on the controlled variable $\alpha$ on the accelerator represented by the detection output signal Sa stored in the process 21. Then, in process 23, a fundamental throttle opening degree $\theta n$ is calculated based on the controlled variable $\alpha$ on the accelerator represented by the detection output signal Sa so as to satisfy, for example, such a relation to the controlled variable $\alpha$ on the accelerator as shown with one of curves in FIG. 5 selected in accordance with one of the first through fourth speeds determined by the gear position G which is represented by the detection output signal Sg stored in the process 21. The fundamental throttle opening degree $\theta n$ which satisfies the relation to the controlled variable $\alpha$ on the accelerator shown with one of the curves in FIG. 5 is set to increase in response to increment of the controlled variable $\theta$ on the accelerator with a first rate of increase, which is relatively large, in a range of relatively small value of the controlled variable $\alpha$ on the accelerator and a second rate of increase which is smaller than the first rate of increase in a range of ordinary value of the controlled variable on the accelerator with which the vehicle travels stably, as understood from FIG. 5.

Figure 6:
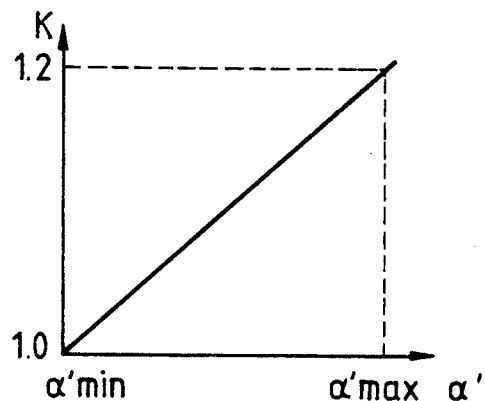

After that, in process 24, a throttle factor K is calculated base on the rate $\alpha'$ of change in the controlled variable $\alpha$ on the accelerator and the travelling speed V of the vehicle represented by the detection output signal Sv stored in the process 21. The throttle factor K thus obtained is set, for example, to increase in response to increment of the rate $\alpha'$ of change in the controlled variable $\alpha$ on the accelerator and to have a value between 1.0 and 1.2 as shown in FIG. 6. Subsequently, in process 25, a final throttle opening degree $\theta o$ is calculated by multiplying the fundamental throttle opening degree $\theta n$ by the throttle factor K, and in process 26, the control signal $C_T$ is produced so as to represent the final throttle opening degree $\theta o$ calculated in the process 25 and supplied to the electric actuator 4 so that the throttle valve 3 is controlled by the electric actuator 4 to have an actual opening degree corresponding to the final throttle opening degree $\theta o$, and after that the step returns to the process 21.

In the throttle valve control performed in such a manner as mentioned above, since the fundamental throttle opening degree $\theta n$ is set to increase in response to increment of the controlled variable $\alpha$ on the accelerator with the relatively large rate of increase in the range of relatively small value of the controlled variable $\alpha$ on the accelerator, an accelerating characteristic of the vehicle in its start to travel is improved. Further, the fundamental throttle opening degree $\theta n$ may be varied also to increase in response to decrement of speed of the engine 1.

Figure 7:
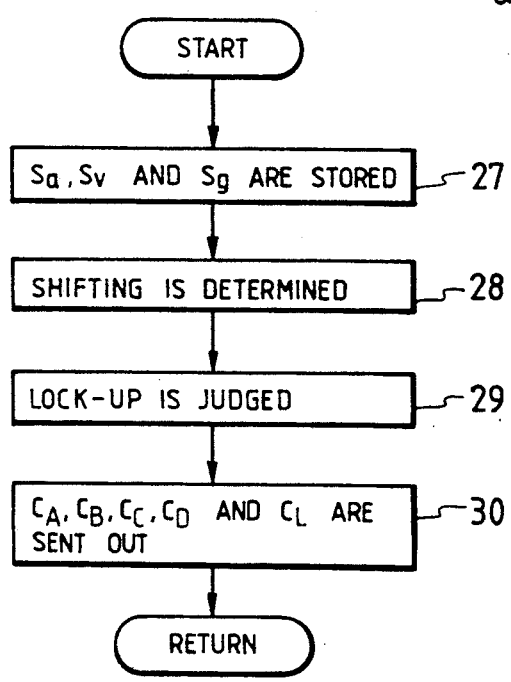
FIG. 7 is a flow chart showing an example of an operation program for a speed change control performed by the microcomputer which is used in the controller employed in the embodiment shown in FIG. 1.

An operation program of the microcomputer constituting the controller 12 for conducting the aforementioned speed change control is carried out in accordance with a flow chart shown in FIG. 7.

Figure 8:
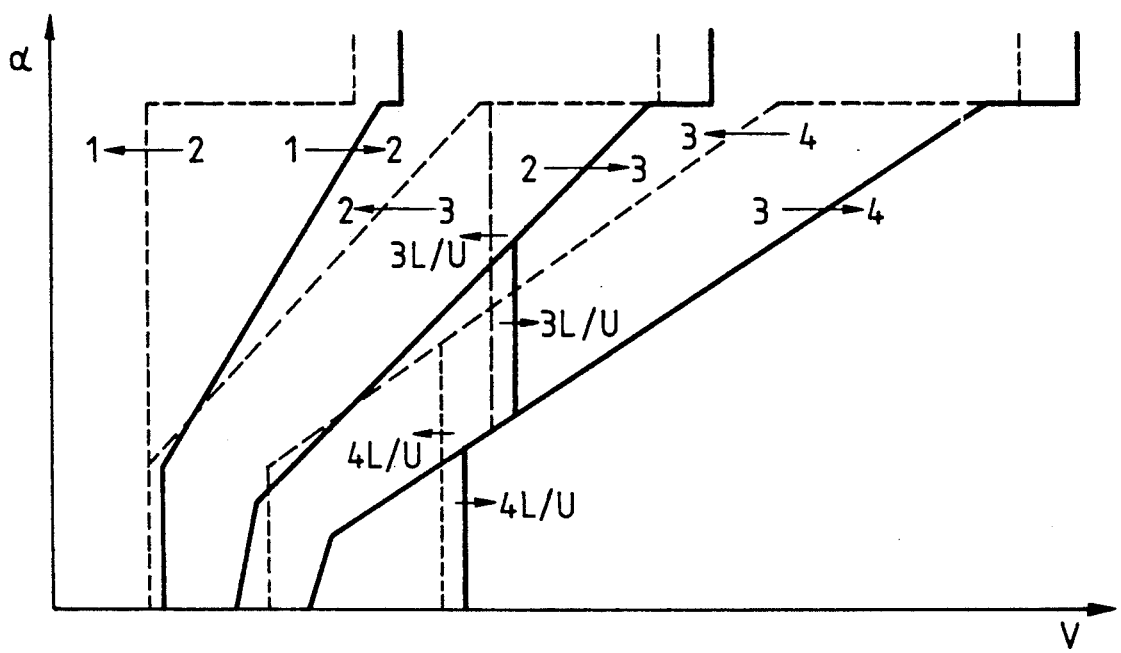
FIG. 8 is a speed change characteristic map used for explaining the operation carried out in accordance with the flow chart shown in FIG. 7.

According to the flow chart shown in FIG. 7, first, in process 27, the detection output signals Sa, Sv and Sg are stored. Then, in process 28, the controlled variable $\alpha$ on the accelerator represented by the detection output signal Sa stored in the process 27 and the travelling speed V of the vehicle represented by the detection output signal Sv stored in the process 27 are checked up on shifting-up and shifting-down lines in a predetermined speed change characteristic map, for example, as shown in FIG. 8, which has first to second, second to third, and third to fourth shifting-up lines (1→2, 2→3 and 3→4), fourth to third, third to second, and second to first shifting-down lines (3←4, 2←3, 1←2), locking-up lines (→3L/U, →4L/U) and lock-up releasing lines (3L/U←, 4L/U←), and shifting-up or shifting-down from the gear position G represented by the detection output signal Sg stored in the process 27 is determined based on a result of the checking up. Further, in process 29, the controlled variable $\alpha$ on the accelerator and the travelling speed V of the vehicle are checked up on the locking-up lines and lock-up releasing lines in the predetermined speed change characteristic map as shown in FIG. 8, and it is decided that a lock-up state held by the lock-up clutch 32 accompanying with the torque converter portion 6 is to be made or released.

Subsequently, in process 30, the driving signals $C_A$, $C_B$, $C_C$ and $C_D$ according to the determination of the shifting of gear position made in the process 28 and the driving signal $C_L$ according to the decision concerning the lock-up state made in the process 29 are produced, then the driving signals $C_A$, $C_B$, $C_C$ and $C_D$ are supplied to the solenoid valves 62, 63, 71 and 72, respectively, for causing the speed change mechanism in the power transmitting gear arrangement portion 7 to conduct a shifting-up or shifting-down operation and the driving signal $C_L$ is supplied to the solenoid valve 61 for causing the lock-up clutch 32 accompanying with the torque converter portion 6 to be engaged or disengaged. After that, the step returns to the process 27.

Figure 9:
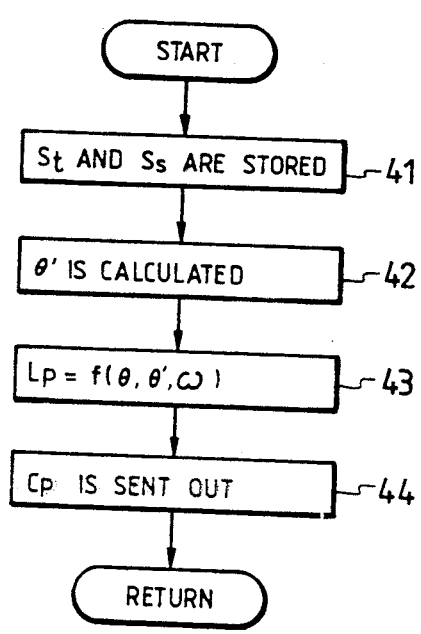
FIG. 9 is a flow chart showing an example of an operation program for an operating oil pressure control performed by the microcomputer which is used in the controller employed in the embodiment shown in FIG. 1.

Further, an operation program of the microcomputer constituting the controller 12 for conducting the aforementioned operating oil pressure control is carried out in accordance with a flow chart shown in FIG. 9.

According to the flow chart shown in FIG. 9, first, in process 41, the detection output signals St and Ss are stored. Next, in process 42, a rate $\theta'$ of change in the opening degree $\theta$ of the throttle valve 3 is calculated base on the opening degree $\theta$ of the throttle valve 3 represented by the detection output signal St stored in the process 41. Then, in process 43, a target line pressure $L_P$, which corresponds to a value of the operating oil pressure in the pressure line 100 appropriate to the output of the engine 1, 25 is calculated as a function defined by the opening degree $\theta$ of the throttle valve 3 represented by the detection output signal St stored in the process 41, the rate $\theta'$ of change in the opening degree $\theta$ of the throttle valve 3 calculated in the process 42, and the turbine speed $\omega$ represented by the detection output signal Ss stored in the process 41 [LP=f($\theta,\theta'$, $\omega$)], so as to be produced fundamentally based on the opening degree of the throttle valve 3 and compensated in accordance with both the rate of change in the opening degree $\theta$ of the throttle valve 3 and the turbine speed $\Omega$. The target line pressure $L_P$ thus obtained is caused to satisfy, for example, such a relation to the turbine speed $\omega$ as shown with bent lines in FIG. 10 each of which is selected in accordance with the value of the opening degree $\theta$ of the throttle valve 3, and further to satisfy also such a relation to the opening degree $\theta$ of the throttle valve 3 as shown with a bent line in FIG. 11 under a condition wherein the turbine speed $\omega$ is set to be $\omega a$ with which the target line pressure $L_P$ is able to vary from $L_{Pb}$ to $L_{Pa}$ as shown in FIG. 10.

Figure 10:
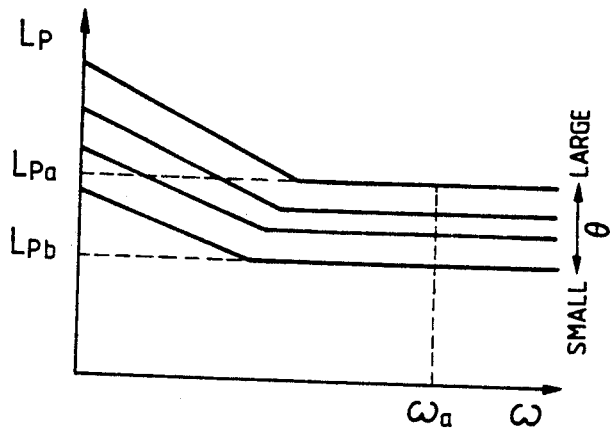
FIGS. 10 and 11 are graphic diagrams used for explaining the operation carried out in accordance with the flow chart shown in FIG. 9.
Figure 11:
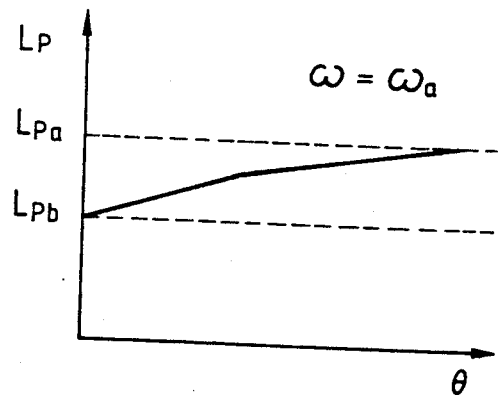

The target line pressure $L_P$ calculated as mentioned above is set to have a relatively large value in a range of relatively small value of the turbine speed $\omega$ in which the torque converter 6 is operative to perform a torque amplifying operation, compared with a value thereof in a range of relatively large value of the turbine speed $\omega$, as understood from FIG. 10, and also set to increase in response to increment of the opening degree $\theta$ of the throttle valve 3, as understood from FIG. 11. In the increase in the target line pressure $L_P$ shown in FIG. 11, a rate of increase in a range of relatively small value of the opening degree $\theta$ of the throttle valve 3 is larger than that in a range of relatively large value of the opening degree $\theta$ of the throttle valve 3. The target line pressure $L_P$ is further set to increase in response to increment of the rate $\theta'$ of change in the opening degree $\theta$ of the throttle valve 3 when the rate $\theta'$ of change in the opening degree $\theta$ of the throttle valve 3 has a value equal to or larger than a first predetermined value and smaller than a second predetermined value which is larger than the first predetermined value, and to be uninfluenced by the rate $\theta'$ of change in the opening degree $\theta$ of the throttle valve 3 when the rate $\theta'$ of change in the opening degree $\theta$. of the throttle valve 3 has a value equal to or larger than the second predetermined value.

Subsequently, in process 44, the driving signal $C_P$ is produced so as to represent the target line pressure $L_P$ calculated in the process 43 and supplied to the solenoid valve 64 so that the operating oil pressure in the pressure line 100, which is applied various elements in the speed change mechanism in the power transmitting gear arrangement portion 7 as the line pressure, is controlled through the pressure regulator valve 52 to have a pressure value corresponding to the target line pressure $L_P$ and appropriate to the output of the engine 1, and then the step returns to the process 41. In the control of the operating oil pressure in the pressure line 100 thus carried out, since the target line pressure $L_P$ is compensated in accordance with the rate $\theta'$ of change in the opening degree $\theta'$ of the throttle valve 3, so as to increase in response to increment of the rate $\theta'$ of change in the opening degree $\theta$ of the throttle valve 3 when the rate $\theta'$ of change in the opening degree $\theta$ of the throttle valve 3 has a value between the finest predetermined value and the second predetermined larger than the first predetermined value, the operating oil pressure in the pressure line 100 is increased to have the pressure value appropriate to the output of the engine 1 without having any substantial time lag.

In the embodiment provided with the controller 12 operating as described above, the speed change control is carried out in response to variations in the controlled variable $\alpha$ on the accelerator and variations in the travelling speed V of the vehicle and therefore an undesirable hunting condition the speed change operation in which unnecessary speed changes arise repeatedly is prevented from being caused even though the engine 1 operates with an increased rate of variation in the opening degree $\theta$ of the throttle valve 3 to the controlled variable $\alpha$ on the accelerator so that the opening degree $\theta$ of the throttle valve 3 is varied suddenly in response to a small variation in the controlled variable $\alpha$ on the accelerator. Further, in the embodiment described above, the operating oil pressure control is carried out in response to variations in the opening degree $\theta$ of the throttle valve 3 and therefore the operating oil pressure in the oil hydraulic control circuit portion 8 is properly controlled to have the pressure value appropriate to the output of the engine 1 and thereby to keep selected one or more of the engaging friction elements in the speed change mechanism to be in engagement without shocks of great degree on the occasion of each speed change operation.

What is claimed is:

1. A control system for a power train provided in a vehicle to include a engine which has an engine output adjusting device controlled through an electric actuator in accordance with a first controlled variable on an accelerator accompanying with the engine and an automatic transmission which is coupled with the engine and in which a speed change operation is automatically performed by means of operating oil pressure produced in an oil hydraulic control circuit arrangement for actuating a speed change mechanism contained in the automatic transmission to have engaging friction elements and controlled to vary in accordance with an operating condition of the engine, said control system comprising:
   first detecting means for detecting the first controlled variable on the accelerator,
   second detecting means for detecting a second controlled variable on the engine output adjusting device,
   third detecting means for detecting a traveling speed of the vehicle,
   speed change control means for controlling the speed change mechanism to cause the same to carry out the speed change operation based on detection outputs of said first and third detecting means, and
   operating oil pressure control means for controlling the operating oil pressure applied to the engaging friction elements in the speed change mechanism from the oil hydraulic control circuit arrangement based on a detection output of said second detecting means;
   wherein said engine output adjusting device is controlled by the electric actuator according to the second controlled variable, and wherein said second controlled variable is determined by the electric actuator according to a predetermined relation to vary in response to variations in the first controlled variable on the accelerator.

2. The control system of claim 1, wherein said automatic transmission further contains a torque converter which is operative to couple the engine with the speed change mechanism in the automatic transmission and accompanied with fourth detecting means for detecting a turbine speed int eh torque converter, and said operating oil pressure control means comprises pressure compensating means for compensating the operating oil pressure applied to the engaging friction elements in the speed change mechanism in accordance with the turbine speed detected by said fourth detecting means; and wherein said pressure compensating means is operative to set the operating oil pressure applied to the engaging friction elements in the speed change mechanism to have a relatively large value in a range of relatively small value of the turbine speed compared with a value thereof in a range of relatively large value of the turbine speed.

3. The control system of claim 1 wherein said operating oil pressure control means is operative to set the operating oil pressure applied to the engaging friction elements in the speed change mechanism to increase in response to increment of the second controlled variable on the engine output adjusting device detected by said second detecting means with a first rate of increase in a range of relatively small value of the second controlled variable on the engine output adjusting device and a second rate of increase which is smaller than said first rate of increase in a range of relatively large value of the second controlled variable on the engine output adjusting device.

4. A control system for a power train provided in a vehicle to include an engine which has an engine output adjusting device controlled through an electric actuator in accordance with a first controlled variable on an accelerator accompanying with the engine and an automatic transmission which is coupled with the engine and in which a speed change operation is automatically performed by means of operating oil pressure produced in an oil hydraulic control circuit arrangement for actuating speed change mechanism contained in the automatic transmission to have engaging friction elements and controlled to vary in accordance with an operating condition of the engine, said control system comprising:

first detecting means for detecting the first controlled variable on the accelerator, second detecting means for detecting a second controlled variable on the engine output adjusting device, third detecting means for detecting a traveling speed of the vehicle, speed change control means for controlling the speed change mechanism to cause the same to carry out the speed change operation based on detection outputs of said first and third detecting means, and operating oil pressure control means for controlling the operating oil pressure applied to the engaging friction elements in the speed change mechanism from the oil hydraulic control circuit arrangement based on a detection output of said second detecting means;

wherein said engine output adjusting device is controlled by the electric actuator according to the second controlled variable, and wherein the second controlled variable is determined by the electric actuator according to a predetermined relation to increase in response to an increase of the first controlled variable on the accelerator;

said second controlled variable increasing at a first rate with respect to said first controlled variable in a first range of values of said first controlled variable;

said second controlled variable increasing at a second rate with respect to said first controlled variable in a second range of values of said first controlled variable; wherein said second rate is smaller than said first rate, and wherein values of said first controlled variable in said first range are smaller than values of said first controlled variable in said second range, said second range of values comprising values of said first controlled variable in said second range, said second range of values comprising values of said first controlled variable for which the vehicle travels stably.

5. The control system of claim 4, wherein said automatic transmission further contains a torque converter which is operative to couple the engine with the speed change mechanism in the automatic transmission and accompanied with fourth detecting means for detecting a turbine speed in the torque converter, and said operating oil pressure control means comprises pressure compensating means for compensating the operating oil pressure applied to the engaging friction elements in the speed change mechanism in accordance with the turbine speed detected by said fourth detecting means; and wherein said pressure compensating means is operative to set the operating oil pressure applied to the engaging friction elements in the speed change mechanism to have a relatively large value in a range of relatively small value of the turbine speed compared with a value thereof in a range of relatively large value of the turbine speed.

6. The control system of claim 4, wherein said operating oil pressure control means is operative to set the operating oil pressure applied to the engaging friction elements in the speed change mechanism to increase in response to increment of the second controlled variable on the engine output adjusting device detected by said second detecting means with a first rate of increase in a range of relatively small value of the second controlled variable on the engine output adjusting device detected by said second detecting means with a first rate of increase in a range of relatively small value of the second controlled variable on the engine output adjusting device and a second rate of increase which is smaller than said first rage of increase in a range of relatively large value of the second controlled variable on the engine output adjusting device.

7. A control system for a power train provided in a vehicle to include an engine which has an engine output adjusting device controlled through an electric actuator in accordance with a first controlled variable on an accelerator accompanying with the engine and an automatic transmission which is coupled with the engine and in which a speed change operation is automatically performed by means of operating oil pressure produced in an oil hydraulic control circuit arrangement for actuating a speed change mechanism contained in the automatic transmission to have engaging friction elements and controlled to vary in accordance with an operating condition of the engine, said control system comprising:

first detecting means for detecting the first controlled variable on the accelerator, second detecting means for detecting a second controlled variable on the engine output adjusting device, third detecting means for detecting a travelling speed of the vehicle, speed change control means for controlling the speed change mechanism to cause the same to carry out the speed change operation based on detection outputs of said first and third detecting means, and operating oil pressure control means for controlling the operating oil pressure applied to the engaging friction elements in the speed change mechanism from the oil hydraulic control circuit arrangement based on a detection output of said second detecting means;

wherein said automatic transmission further contains a torque converter which is operative to couple the engine with the speed change mechanism in the automatic transmission and accompanied with fourth detecting means for detecting a turbine speed in the torque converter, and said operating oil pressure control means comprises pressure compensating means for compensating the operating oil pressure applied to the engaging friction elements in the speed change mechanism in accordance with the turbine speed detected by said fourth detecting means; and wherein said pressure compensating means is operative to set the operating oil pressure applied to the engaging friction elements in the speed change mechanism to have a relatively large value in a range of relatively small value of the turbine speed compared with a value thereof in a range of relatively large value of the turbine speed.

8. A control system according to claim 7, wherein said operating oil pressure control means further comprises fifth detecting means for obtaining a rate of change in the controlled variable on the engine output adjusting device and additional pressure compensating means for compensating the operating oil pressure applied to the engaging friction elements in the speed change mechanism so as to cause the same to increase in response to increment of the rate of change in the controlled variable on the engine output adjusting device obtained by said fifth detecting means.

9. A control system according to claim 8, wherein said operating oil pressure control means is operative to set the operating oil pressure applied to the engaging friction elements in the speed change mechanism to increase in response to increment of the controlled variable on the engine output adjusting device detected by said second detecting means with a first rate of increase in a range of relatively small value of the controlled variable on the engine output adjusting device and a second rate of increase which is smaller than said first rate of increase in a range of relatively large value of the controlled variable on the engine output adjusting device.

10. A control system for a power train provided in a vehicle to include an engine which has an engine output adjusting device controlled through an electric actuator in accordance with a first controlled variable on an accelerator accompanying with the engine and an automatic transmission which is coupled with the engine and in which a speed change operation is automatically performed by means of operating oil pressure produced in an oil hydraulic control circuit arrangement for actuating a speed change mechanism contained in the automatic transmission to have engaging friction elements and controlled to vary in accordance with an operating condition of the engine, said control system comprising:

first detecting means for detecting the first controlled variable on the accelerator, second detecting means for detecting a second controlled variable on the engine output adjusting device, third detecting means for controlling travelling speed of the vehicle, speed change control means for controlling the speed change mechanism to cause the same to carry out the speed change operation based on detection outputs of said first and third detecting means, and operating oil pressure control means for controlling the operating oilpressure applied to the engaging friction elements in the speed change mechanism from the oil hydraulic control circuit arrangement based on a detection output of said second detecting means; and wherein said operating oil pressure control means is operative to set the operating oil pressure applied to the engaging friction elements in the speed change mechanism to increase in response to increment of the second controlled variable on the engine output adjusting device detected by said second detecting means with a first rate of increase in a range of relatively small value of the second controlled variable on the engine output adjusting device detected by said second detecting means with a first rate of increase in a range of relatively small value of the second controlled variable on the engine output adjusting device and a second rate of increase which is smaller than said first rate of increase in a range of relatively large value of the second controlled variable on the engine output adjusting device.

11. A control system for a power train provided in a vehicle to include an engine which has an engine output adjusting device controlled through an electric actuator in accordance with a first controlled variable on an accelerator accompanying with the engine and an automatic transmission which is coupled with the engine and in which a speed change operation is automatically performed by means of operating oil pressure produced in an oil hydraulic control circuit arrangement for actuating a speed change mechanism contained in the automatic transmission to have engaging friction elements and controlled to vary in accordance with an operating condition of the engine, said control system comprising:

first detecting means for detecting the first controlled variable on the accelerator, second detecting means for detecting a second controlled variable on the engine output adjusting device, third detecting means for detecting a travelling speed of the vehicle, speed change control means for controlling the speed change mechanism to cause the same to carry out the speed change operation based on detection outputs of said first and third detecting means, and operating oil pressure control means for controlling the operating oil pressure applied to the engaging friction elements in the speed change mechanism from the oil hydraulic control circuit arrangement based on a detection output of said second detecting means;

wherein said electric actuator is operative to control the controlled variable on the engine output adjusting device to increase in response to increment of the first rate of increase in a range of relatively small value of the first controlled variable on the accelerator and a second rate of increase which is smaller than said first rate of increase in a range of ordinary value of the first controlled variable on the accelerator with which the vehicle travels stably; and wherein said automatic transmission further contains a torque converter which is operative to couple the engine with the speed change mechanism in the automatic transmission and accompanied with fourth detecting means for detecting a turbine speed in the torque converter, and said operating oil pressure control means comprises pressure compensating means operative to compensate the operating oil pressure applied to the engaging friction elements in the speed change mechanism to have a relatively large value in a range of relatively small value of the turbine speed detected by said fourth detecting means compared with a value thereof in a range of relatively large value of the turbine speed.

12. A control systems for a power train provided in a vehicle to include an engine which has an engine output adjusting device controlled through an electric actuator in accordance with a first controlled variable on an accelerator accompanying with the engine and an automatic transmission which is coupled with the engine and in which a speed change operation is automatically performed by means of operating oilpressure produced in an oil hydraulic control circuit arrangement for actuating a speed change mechanism contained in the automatic transmission to have engaging friction elements and controlled to vary in accordance with an operating condition of the engine, said control system comprising:
 first detecting means for detecting the first controlled variable on the accelerator,
 second detecting means for detecting a second controlled variable on the engine output adjusting device,
 third detecting means for detecting a travelling speed of the vehicle,
 speed change control means for controlling the speed change mechanism to cause the same to carry out the speed change operation based on detection outputs of said first and third detecting means, and
 operating oil pressure control means for controlling the operating oilpressure applied to the engaging friction elements in the speed change mechanism from the oil hydraulic control circuit arrangement based on a detection output of said second detecting means;
 wherein said engine output adjusting device is controlled by the electric actuator according to said second controlled variable, and wherein said second controlled variable varies with respect to said first controlled variable according to a plurality of relations wherein the relation varies according to the shift position of the automatic transmission.

13. The control system of claim 12, wherein said automatic transmission further contains a torque converter which is operative to couple the engine with the speed change mechanism in the automatic transmission and accompanied with fourth detecting means for detecting a turbine speed in the torque converter, and said operating oil pressure control means comprises pressure compensating mean for compensating the operating oil pressure applied to the engaging friction elements in the speed change mechanism in accordance with the turbine speed detected by said fourth detecting means; and
 wherein said pressure compensating means is operative to set the operating oil pressure applied to the engaging friction elements in the speed change mechanism to have a relatively large value in a range of relatively small value of the turbine speed compared with a value thereof in a range of relatively large value of the turbine speed.

14. The control system of claim 12, wherein said operating oil pressure control means is operative to set the operating oil pressure applied to the engaging friction elements in the speed change mechanism to increase in response to increment of the second controlled variable on the engine output adjusting device detected by said second detecting means with a first rate of increase in a range of relatively small value of the second controlled variable on the engine output adjusting device and a second rate of increase which is smaller than said first rate of increase in a range of relatively large value of the second controlled variable on the engine output adjusting 15. A control system for a power train provided in a vehicle to include an engine which has an engine output adjusting device controlled through an electric actuator in accordance with a first controlled variable on an accelerator accompanying with the engine and an automatic transmission which is coupled with the engine and in which a speed change operation is automatically performed by means of operating oil pressure produced in an oil hydraulic control circuit arrangement for actuating a speed change mechanism contained in the automatic transmission to have engaging friction elements and controlled to vary in accordance with an operating condition of the engine, said control system comprising:
 first detecting means for detecting the first controlled variable on the accelerator,
 second detecting means for detecting a second controlled variable on the engine output adjusting device,
 third detecting means for detecting a travelling speed of the vehicle,
 speed change control means for controlling the speed change mechanism to cause the same to carry out the speed change operation based on detecting outputs of said first and third detecting means, and
 operating oilpressure control means for controlling the operating oil pressure applied to the engaging friction elements in the speed change mechanism from the oil hydraulic control circuit arrangement based on a detection output of said second detecting means;
 wherein the engine output adjusting device is controlled by the electric actuator such that a degree of throttle opening is defined by a product of a fundamental throttle opening degree and a throttle factor, said throttle factor varying according to a rate of change of said first controlled variable.

16. The control system of claim 15, wherein said automatic transmission further contains a torque converter which is operative to couple the engine with the speed change mechanism in the automatic transmission and accompanied with fourth detecting means for detecting a turbine speed in the torque converter, and said operating oil pressure control means comprises pressure compensating means for compensating the operating oil pressure applied to the engaging friction elements in the speed change mechanism in accordance with the turbine speed detected by said fourth detecting means; and
 wherein said pressure compensating means is operative to set the operating oil pressure applied to the engaging friction elements in the speed change mechanism to have a relatively large value in a range of relatively small value of the turbine speed compared with a value thereof in a range of relatively large value of the turbine speed.

17. The control system of claim 15, wherein said operating oil pressure control means is operative to set the operating oil pressure applied to the engaging friction elements in the speed change mechanism to increase in response to increment of the second controlled variable on the engine output adjusting device detected by said second detecting means with a first rate of increase in a range of relative small value of the second controlled variable on the engine output adjusting device and a second rate of increase which is smaller than said first rate of increase in a range of relatively large value of the second controlled variable on the engine output adjusting device.

* * * * *